US011063755B2

(12) United States Patent
Handschuh

(10) Patent No.: US 11,063,755 B2
(45) Date of Patent: Jul. 13, 2021

(54) GENERATING A KEY AT A DEVICE BASED ON A MEMORY OF THE DEVICE

(71) Applicant: Cryptography Research, Inc., Sunnyvale, CA (US)

(72) Inventor: Helena Handschuh, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 77 days.

(21) Appl. No.: 16/405,065

(22) Filed: May 7, 2019

(65) Prior Publication Data

US 2019/0342092 A1 Nov. 7, 2019

Related U.S. Application Data

(60) Provisional application No. 62/668,232, filed on May 7, 2018.

(51) Int. Cl.
*H04L 9/00* (2006.01)
*H04L 9/06* (2006.01)
*H04L 9/08* (2006.01)

(52) U.S. Cl.
CPC ............ *H04L 9/0869* (2013.01); *H04L 9/006* (2013.01); *H04L 9/0643* (2013.01); *H04L 9/0816* (2013.01); *H04L 9/0866* (2013.01); *H04L 9/0897* (2013.01)

(58) Field of Classification Search
None
See application file for complete search history.

(56) References Cited

U.S. PATENT DOCUMENTS

| 8,819,410 B2 * | 8/2014 | Sidman ............... H04L 61/2521 713/150 |
| 9,383,969 B2 | 7/2016 | Van Der Sluis et al. |
| 9,430,406 B2 | 8/2016 | Van Der Sluis et al. |
| 9,729,528 B2 | 8/2017 | Zakaria et al. |
| 10,097,353 B1 * | 10/2018 | Carlson ............ H04W 12/0608 |
| 2014/0185795 A1 * | 7/2014 | Gotze .................. H04L 9/0866 380/44 |
| 2015/0234751 A1 * | 8/2015 | Van Der Sluis ...... H04L 9/3278 713/193 |
| 2015/0370247 A1 * | 12/2015 | Newell ............ G05B 19/41875 702/81 |
| 2017/0048070 A1 | 2/2017 | Gulati et al. |
| 2017/0244729 A1 * | 8/2017 | Fahrny ................ H04L 63/0823 |

OTHER PUBLICATIONS

D. Holcomb, W. Burleson, K. Fu, Power-up SRAM State as an Identifying Fingerprint and Source of True Random Numbers, IEEE Transactions on Computers, 2009. (Year: 2009).*

(Continued)

*Primary Examiner* — Joseph P Hirl
*Assistant Examiner* — Hassan Saadoun
(74) *Attorney, Agent, or Firm* — Lowenstein Sandler LLP

(57) ABSTRACT

An indication of a key generation function may be received from a server. A random value may be received based on a volatile memory of a device. A cryptographic key may be generated based on the key generation function from the server and the random value that is based on the volatile memory of the device. The cryptographic key may be stored at a non-volatile memory of the device.

20 Claims, 5 Drawing Sheets

(56) References Cited

OTHER PUBLICATIONS

"Edward Suh, Physical Unclonable Functions for Device Authentication and Secret Key Generation, Jun. 2007, IEEE, pp. 9-14" (Year: 2007).*
Hardware Random Number Generator, Wikipedia Jan. 12, 2018 Retrieved from "https://en.wikipedia.org/w/index.php?title=Hardware_random_number_generator&oldid=819483569".

* cited by examiner

GENERATING A KEY AT A DEVICE BASED ON A MEMORY OF THE DEVICE

RELATED APPLICATION

This application claims the benefit under 35 U.S.C. § 119(e) of U.S. Provisional Application 62/668,232 filed on May 7, 2018, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
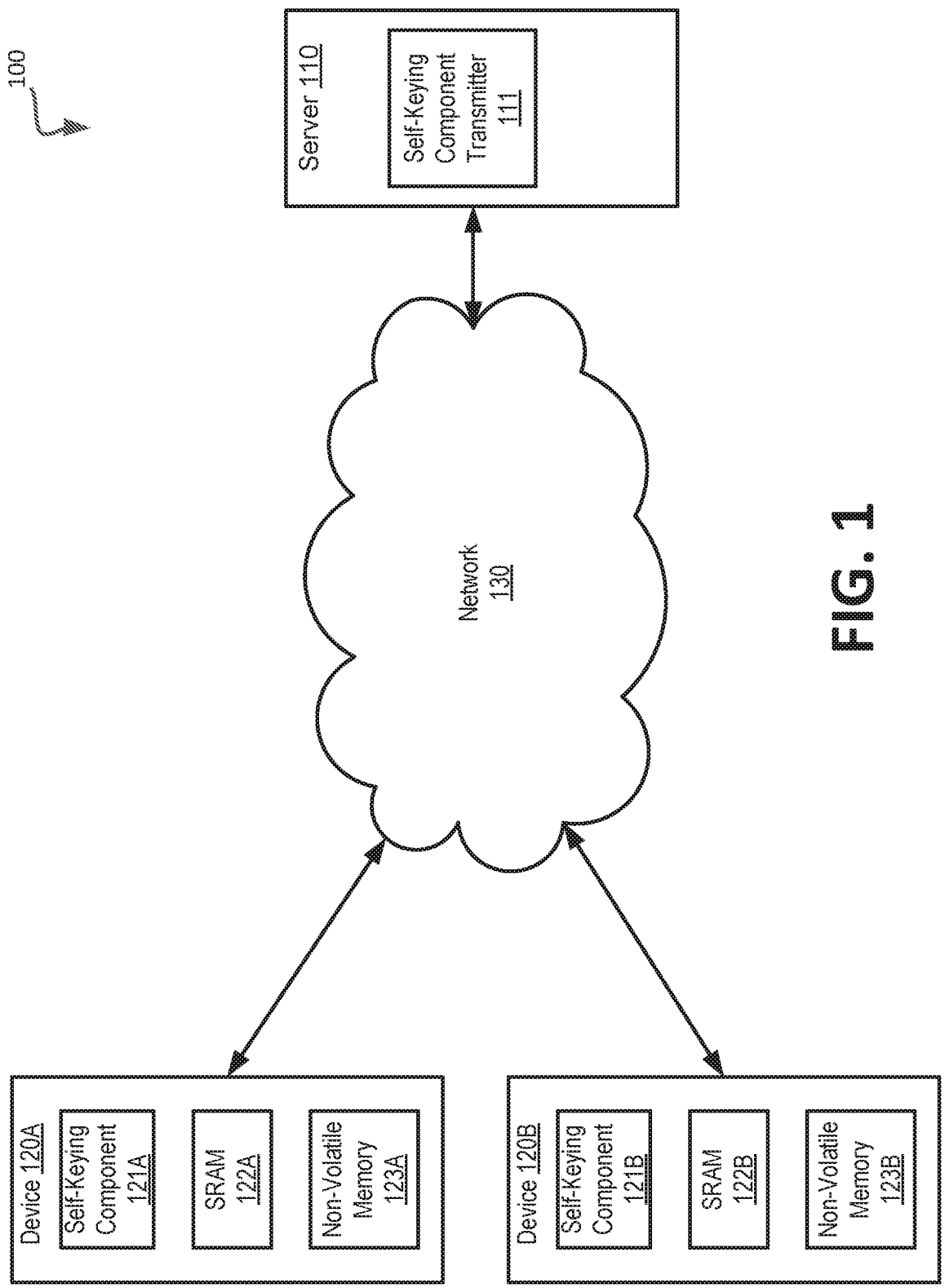
FIG. 1 illustrates an example environment to generate a cryptographic key at a device based on a memory of the device in accordance with some embodiments of the present disclosure.

Aspects of the present disclosure are directed to generating a key at a device based on a memory of the device. The device may be an internet of things (IoT) device that communicates with other devices or servers over a network. A server may be used to manage the device. For example, the server may provide an IoT management service to manage multiple devices that communicate with the server over the network.

An IoT device (hereinafter "device") may be used prior to being managed by the management service provided by a server. For example, a user may utilize the device for some time before enrolling the device with the management service. When the device is enrolled with the management service, communication between the device and the management service may be encrypted. For example, a cryptographic key may be used to transmit data from the device to the server providing the management service. However, certain devices being used may not include a cryptographic key. For example, a device may be manufactured without storing a cryptographic key. As a result, the device may not be able to securely communicate with the server or another device by using the cryptographic key.

Aspects of the present disclosure address the above and other deficiencies by generating a cryptographic key at the device based on a memory of the device. The cryptographic key may be generated based on data values that are derived from the memory of the device and a software package that is provided by the management service. For example, the software package may be transmitted by the server to the device over the network when the device initially communicates with the server after enrolling into the management service. The software package may include or identify a hash function that may be used to generate the cryptographic key. For example, the input of the hash function may be the data values that are derived from the memory of the device and the output of the hash function may be the cryptographic key. The memory of the device may be, but is not limited to, a static random access memory (SRAM). When the SRAM is initialized at power up of the device, the various bits of the SRAM may correspond to different random bit values (e.g., 0 or 1). Such random initialization values of the SRAM may be unique to the device at the time that the SRAM is initialized. For example, an SRAM of a device may include different initialization values than the SRAM of another device. Such random values from the SRAM of the device may thus be used to generate a unique cryptographic key to be used for secure communication between the device and other devices or the management service. As such, the software package from the server may be used to instruct the device to use the included hash function to generate a cryptographic key based on the random data values of the SRAM that is included in the device. Subsequently, the cryptographic key may be stored at a non-volatile memory of the device and may be used to encrypt data transmitted from the device to other devices or the server providing the management service.

Advantages of the present disclosure include, but are not limited to, a secure communication with devices that are not manufactured with cryptographic keys stored at the devices. For example, a particular device that has been operating without a stored cryptographic key may receive a software package that includes a hash function. The device may execute the software package to read the random initialization values of the SRAM (or other such memory) of the device and use the random initialization values with the hash function to generate a cryptographic key to encrypt transmitted data.

Since the random values used to generate the cryptographic key are based on the SRAM that is manufactured at the device, additional circuitry or functionality to obtain random values for use in generating the cryptographic key may not be needed. As such, devices with less resources or functionality (e.g., without a random number generator circuit or other such circuits) may utilize existing memory or SRAM to obtain the random values.

FIG. 1 illustrates an example environment 100 to generate a cryptographic key at a device based on a memory of the device. In general, the environment 100 may include one or more devices (e.g., IoT devices) and a server that manages the devices.

As shown in FIG. 1, the environment 100 may include a device 120A and a device 120B that are coupled with a server 110 over a network 130. The server 110 may provide a management service for the devices 120A and 120B. For example, the management service may be used to identify the devices 120A and 120B (e.g., in response to a user login) and may provide options to remotely configure the devices 120A and 120B. The server 110 may include a self-keying component transmitter 111 that may transmit software over the network 130 to the devices 120A and 120B. The software may be a software package that includes instructions that are to be executed at the devices 120A and 120B. The software package may include or identify an operation that is to be performed to generate a cryptographic key at a respective device 120A or 120B that receives the software package. For example, the software package may include or identify a hash function that is to be executed after a random value is obtained from an SRAM or other such memory of the device 120A or 120B.

The device 120A may include a self-keying component 121A, SRAM 122A, and a non-volatile memory 123A. Similarly, the device 120B may include a self-keying component 121B, SRAM 122B, and a non-volatile memory 123B. In general, a respective self-keying component may receive the software or instructions from the self-keying component transmitter 111 of the server 110 and may perform a series of operations based on the received software or instructions (e.g., the self-keying component 121A or 121B). The instructions may include an operation to obtain random values from the SRAM of the device. In some embodiments, particular bits of the SRAM may be biased towards a value of '0' or a value of '1' at an initialization of a device that includes the SRAM. The biased values may be random at the initialization of the device. As such, random values may be obtained from an initialization of the SRAM when no data from the respective device has been stored at the SRAM. The self-keying component of a device may subsequently identify a hash function that is to be used with the random values to generate a cryptographic key. The cryptographic key may then be stored at the non-volatile memory (e.g., the non-volatile memory 123A or 123B) of the respective device. Subsequently, a device may use the stored cryptographic key to encrypt data that is transmitted over the network 130 to the server 110 or to another device (e.g., from device 120A to device 120B, or vice versa).

Each of the devices 120A and 120B may separately generate a respective cryptographic key for use in secure communication with the server 110. For example, the device 120A may generate a cryptographic key by using a hash function with random values obtained from an initialization of the SRAM 122A and the device 120B may generate another cryptographic key by using the hash function with other random values obtained from an initialization of the SRAM 122B.

Figure 2:
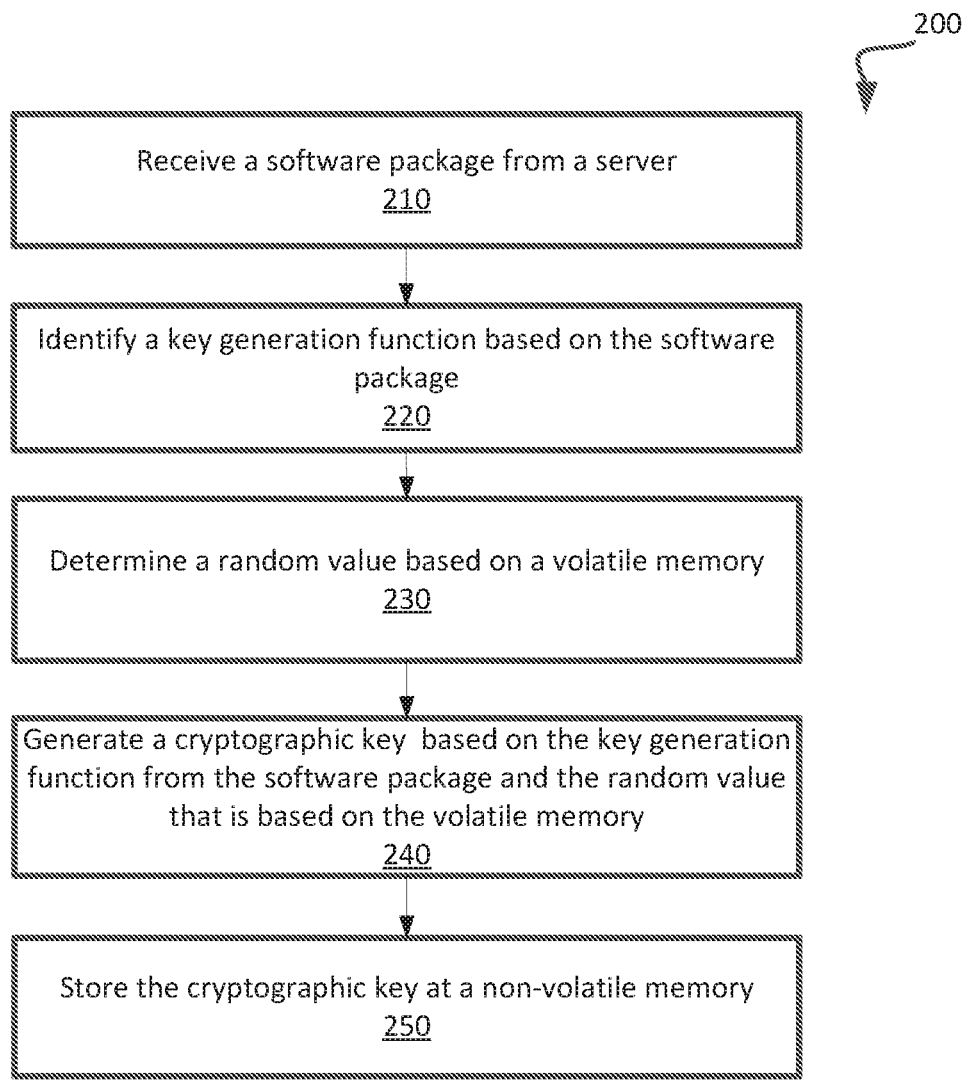
FIG. 2 is a flow diagram of an example method to generate a cryptographic key by using a memory of a device in accordance with some embodiments.

FIG. 2 is a flow diagram of an example method 200 to generate a cryptographic key by using a memory of a device. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the self-keying component 121A or 121B of the device 120A or 120B of FIG. 1.

As shown in FIG. 2, the method 200 may begin, at block 210, with the processing logic receiving a software package from a server. The software package may include one or more instructions or operations to be performed by a device. In some embodiments, the software package may be provided to the device in response to the device communicating with the server (e.g., requesting to enroll with a service of the server). The processing logic may further identify a key generation function based on the software package (block 220). In some embodiments, the key generation function may be a hash function that receives an input of an arbitrary size (e.g., the random values) and generates an output of a fixed size (e.g., the cryptographic key). The software package may include execution code of the hash function or may identify a particular hash function available to the device. For example, in some embodiments, the device may include a hardware or software capability of performing a hash function and in such an example the software package may indicate to utilize the included hash function. The processing logic may determine a random value based on a volatile memory (block 230). For example, the random value may be obtained from a series of bits of an SRAM of the device. The random value may be obtained at initialization or startup of the volatile memory and/or the device that includes the volatile memory. In some embodiments, the random value may be obtained from a series of bits of the SRAM of the device that have not yet been programmed or used to store other data. As such, the random value may be obtained from bits of the SRAM that are intended by the device to not store any data values. An error correction operation may not be performed on the random values that are obtained from the volatile memory at initialization or startup.

Referring to FIG. 2, the processing logic may further generate a cryptographic key based on the key generation function from the software package and the random value that is based on the volatile memory. For example, the hash function may be used to generate the cryptographic key based on the random value as an input to the hash function. Subsequently, the processing logic may store the cryptographic key at a non-volatile memory (block 250). The cryptographic key may subsequently be retrieved from the non-volatile memory to encrypt data generated at the device that is to be transmitted over a network.

In some embodiments, the cryptographic key may be generated based on the random value and additional data from the software package. For example, the cryptographic key may be generated by using the additional data and the random value as an input to the hash function. In some embodiments, the additional data may correspond to another cryptographic key provided by a management service that transmitted the software package. Thus, the cryptographic key generated at the device may be based on a combination of the random values from the volatile memory of the device and the additional data provided in the software package.

The generated cryptographic key may further be returned to the server providing a management service that transmitted the software package to the device. For example, the software package may include a public key of the management service and the generated cryptographic key may be encrypted by the public key of the management service. Subsequently, the management service may decrypt the encrypted cryptographic key by using the private key that corresponds to the public key that was included in the software package. In some embodiments, the cryptographic key that is generated may correspond to a private key. A corresponding public key may be generated and provided to the management service. For example, after the private key has been generated based on the random value and the hash function, the corresponding public key of the private key may be generated and transmitted to the management service. The corresponding public key may be used to encrypt data to the device and the device may use the generated private key to decrypt the encrypted data.

As a result, a device may not initially store a cryptographic key. In some embodiments, the device may provide a request to enroll in a management service that is to manage the device. In response to receiving the request, the management service may provide a software package to the device. In response to receiving the software package, the device may perform a series of operations to generate a cryptographic key. The resulting cryptographic key may then be used to encrypt and/or decrypt data transmitted from or transmitted to the device. The cryptographic key may also be provided to the management service to decrypt the data received from the device.

Figure 3:
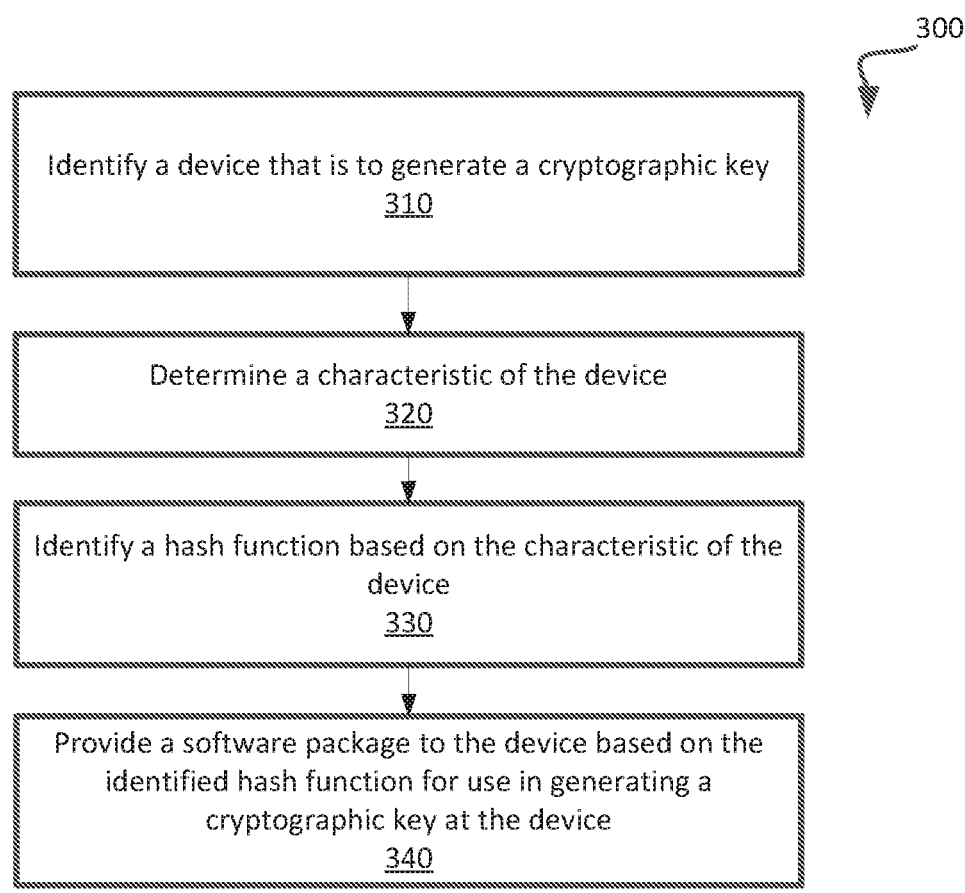
FIG. 3 is a flow diagram of an example method to provide a software package to a device for use in generating a cryptographic key in accordance with some embodiments of the present disclosure.

FIG. 3 is a flow diagram of an example method 300 to provide a software package to a device for use in generating a cryptographic key. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the self-keying component transmitter 111 of the server 110 of FIG. 1.

As shown in FIG. 3, the method 300 may begin, at block 310, with the processing logic identifying a device that is to generate a cryptographic key. For example, a device may provide a request to be enrolled at a management service. The processing logic may further determine a characteristic of the device (block 320). The characteristic of the device may indicate a capability of the device to generate the cryptographic key. For example, the characteristic may correspond to whether the device currently includes a hash function implemented in hardware or software at the device. In some embodiments, the characteristic may correspond to a capability of the device to perform a hash function. For example, the characteristic may correspond to the hardware components and capability of the device to perform the hash function. The processing logic may subsequently identify a hash function based on the characteristic of the device (block 330) and may provide a software package to the device based on the identified hash function for use in generating a cryptographic key at the device (block 340). The hash function may be included in the software package or an identification of the hash function available at the device may be included in the software package. The software package may specify that the random values from the volatile memory of the device are to be used with the hash function to generate the cryptographic key.

In some embodiments, multiple hash functions may be available at the server to be included in the software package and/or multiple hash functions may be currently provided at the device. The software package may then identify or include the hash function that may be better suited for the characteristic of the device. For example, if the hardware capability of the device indicates that the device can perform a particular hash function that may generate a more secure cryptographic key (e.g., a key of more bits or additional security), then the particular hash function may be included or identified instead of another hash function that may generate a less secure cryptographic key.

In the same or alternative embodiments, the software package may be transmitted to the device when the device has not previously generated the cryptographic key. For example, the software package may be transmitted to the device when the device first enrolls with the management service. In the same or alternative embodiments, the software package may be transmitted to the device at a particular time interval. For example, the software package or an instruction to generate a new cryptographic key may be transmitted to the device each time that the particular time interval elapses so that new cryptographic keys may be generated at the device.

Figure 4:
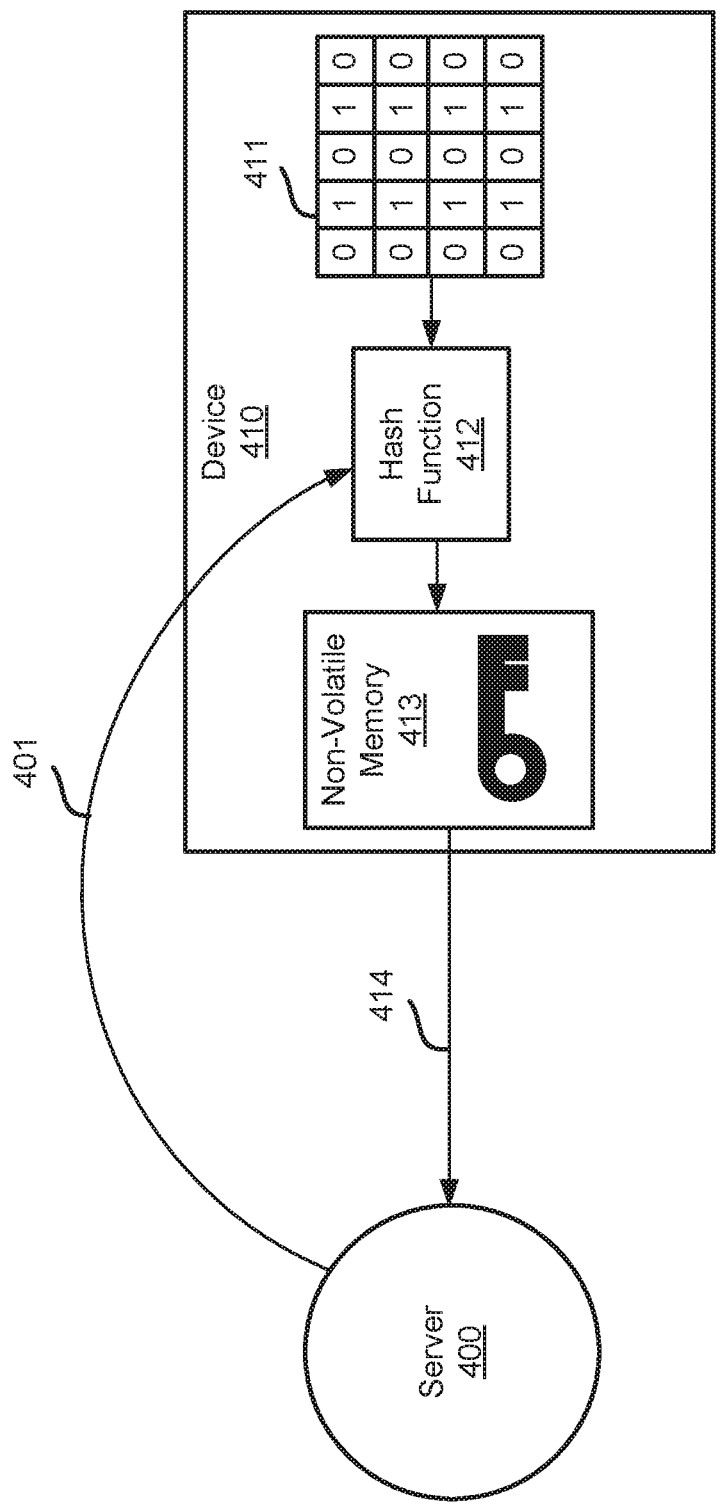
FIG. 4 illustrates the generation of a cryptographic key by a device in accordance with some embodiments of the present disclosure.

FIG. 4 illustrates the generation of a cryptographic key by a device. In general, a server 400 (e.g., server 110) may provide an indication of a hash function to a device 410 (e.g., device 120A and/or 120B) for generating a cryptographic key.

As shown in FIG. 4, the server 400 may provide or indicate a hash function 412 to be used by the device 410. For example, the server 400 may transmit a software package 401 to the device 410 where the software package 401 includes the hash function 412. In some embodiments, the hash function 412 may be stored in the non-volatile memory 413 or volatile memory 411 of the device. After receiving the hash function 412, the device 410 may retrieve random data values from the volatile memory 411 as previously described. The hash function 412 may generate a cryptographic key based on the random data values from the volatile memory 411. The generated cryptographic key may be stored at the non-volatile memory 413. Subsequently, the generated cryptographic key or a corresponding public key 414 may be transmitted from the non-volatile memory 413 of the device 410 to the server 400.

The device 410 may encrypt data by using the cryptographic key stored at the non-volatile memory 413. The server may subsequently decrypt the encrypted data by using the cryptographic key previously transmitted from the device 410 to the server 400.

Figure 5:
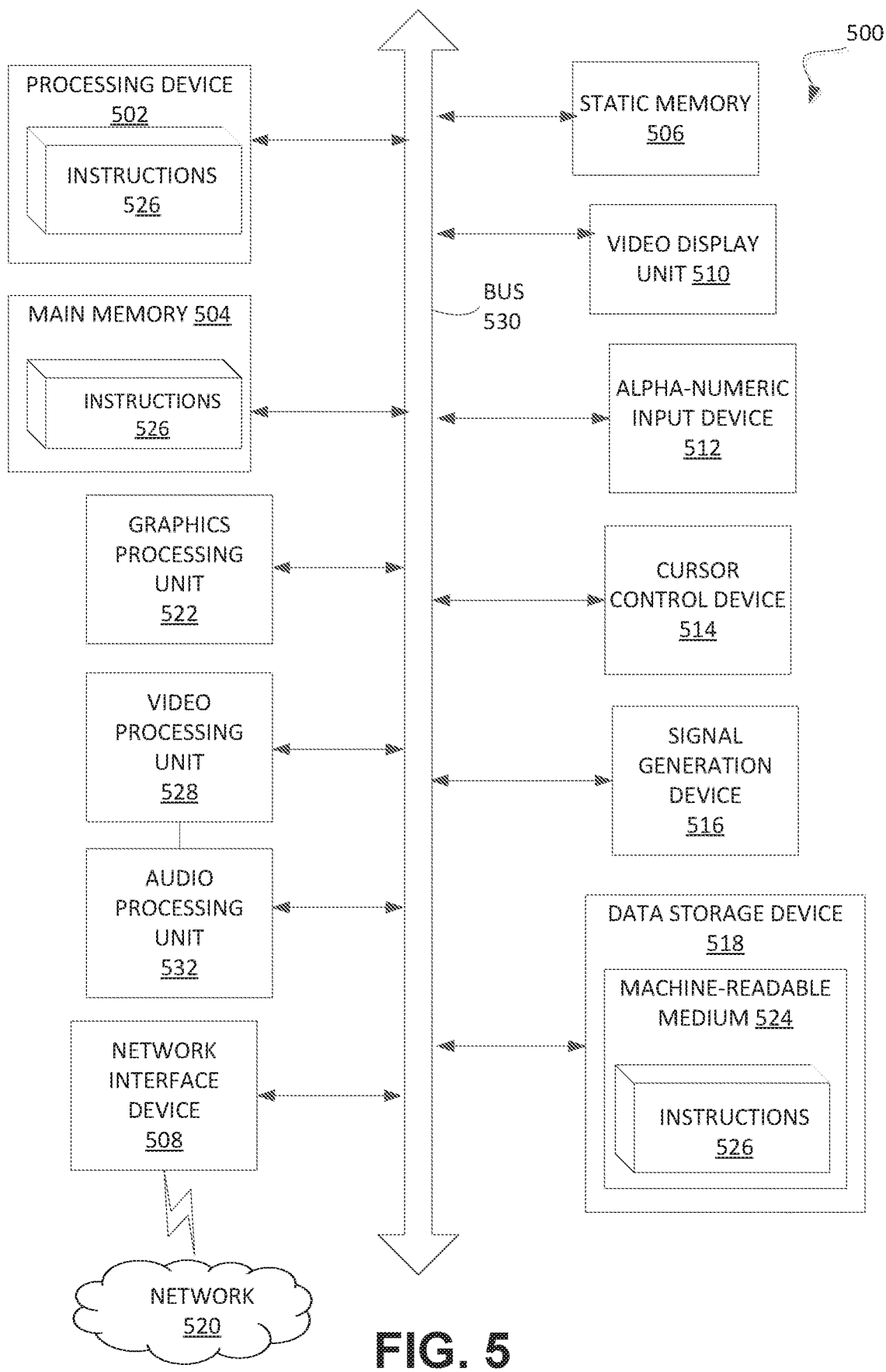
FIG. 5 illustrates a block diagram of an embodiment of a computer system in which some embodiments of the disclosure may operate.

FIG. 5 illustrates an example of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, an IoT device, a smart meter, a home appliance, a thermostat, a surveillance camera, an industrial sensor, an industrial monitor, an Electronic Control Unit (ECU) used in automotive systems, a disposable medical device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality as described herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, the present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
providing to a server, from a device lacking an initial cryptographic key, a request to enroll the device in a management service with the server;
receiving, in response to the request provided to the server, an indication of a key generation function from the server;
receiving a random value based on a volatile memory of the device;
generating, by a processor of the device, a cryptographic key based on the received indication of the key generation function and the random value that is based on the volatile memory of the device; and
storing the cryptographic key at a non-volatile memory of the device.

2. The method of claim 1, wherein the volatile memory of the device is a static random access memory (SRAM), and wherein receiving the random value based on the volatile memory of the device comprises:
identifying the random value from a plurality of bits of the SRAM, the plurality of bits not storing data of the device.

3. The method of claim 1, wherein the key generation function is a hash function.

4. The method of claim 1, wherein receiving the indication of the key generation function from the server comprises:
receiving a software package from the server, the software package including the key generation function for generating the cryptographic key.

5. The method of claim 1, wherein receiving the indication of the key generation function from the server comprises:
receiving a software package from the server, the software package identifying the key generation function of the device for generating the cryptographic key.

6. The method of claim 1, further comprising:
encrypting the cryptographic key with another cryptographic key; and
transmitting the encrypted cryptographic key from the device to the server, the cryptographic key being associated with encrypting or decrypting data transmitted between the device and the server.

7. The method of claim 1, wherein the random value is obtained at startup of the volatile memory of the device.

8. A system comprising:
a memory; and
a processor, operatively coupled with the memory, to:
provide to a server, from a device lacking an initial cryptographic key, a request to enroll the device in a management service with the server;
receive, in response to the request provided to the server, an indication of a key generation function from the server;
receive a random value based on a volatile memory of the device;
generate a cryptographic key based on the received indication of the key generation function and the random value that is based on the volatile memory of the device; and
store the cryptographic key at a non-volatile memory of the device.

9. The system of claim 8, wherein the volatile memory of the device is a static random access memory (SRAM), and wherein to receive the random value based on the volatile memory of the device, the processor is further to:
identify the random value from a plurality of bits of the SRAM, the plurality of bits not storing data of the device.

10. The system of claim 8, wherein the key generation function is a hash function.

11. The system of claim 8, wherein to receive the indication of the key generation function from the server, the processor is further to:
receive a software package from the server, the software package including the key generation function for generating the cryptographic key.

12. The system of claim 8, wherein to receive the indication of the key generation function from the server, the processor is further to:
receive a software package from the server, the software package identifying the key generation function of the device for generating the cryptographic key.

13. The system of claim 8, wherein the processor is further to:
encrypt the cryptographic key with another cryptographic key; and
transmit the encrypted cryptographic key from the device to the server, the cryptographic key being associated with encrypting or decrypting data transmitted between the device and the server.

14. The system of claim 8, wherein the random value is obtained at startup of the volatile memory of the device.

15. A non-transitory computer readable medium comprising instructions that, when executed by a processor, cause the processor to perform operations comprising:
providing to a server, from a device lacking an initial cryptographic key, a request to enroll the device in a management service with the server;
receiving, in response to the request provided to the server, an indication of a key generation function from a server;
receiving a random value based on a volatile memory of a device;
generating a cryptographic key based on the received indication of the key generation function and the random value that is based on the volatile memory of the device; and
storing the cryptographic key at a non-volatile memory of the device.

16. The non-transitory computer readable medium of claim 15, wherein the volatile memory of the device is a static random access memory (SRAM), and wherein to receive the random value based on the volatile memory of the device, the operations further comprising:
identifying the random value from a plurality of bits of the SRAM, the plurality of bits not storing data of the device.

17. The non-transitory computer readable medium of claim 15, wherein the key generation function is a hash function.

18. The non-transitory computer readable medium of claim 15, wherein to receive the indication of the key generation function from the server, the operations further comprising:
receiving a software package from the server, the software package including the key generation function for generating the cryptographic key.

19. The non-transitory computer readable medium of claim 15, wherein to receive the indication of the key generation function from the server, the operations further comprising:
receiving a software package from the server, the software package identifying the key generation function of the device for generating the cryptographic key.

20. The non-transitory computer readable medium of claim 15, wherein the random value is obtained at startup of the volatile memory of the device.

* * * * *